United States Patent
Chen et al.

(10) Patent No.: US 7,034,506 B2
(45) Date of Patent: Apr. 25, 2006

(54) EMERGENCY LIGHTING EQUIPMENT WITH AUTOMATIC CHARGE/DISCHARGE AND MONITORING SYSTEM

(75) Inventors: Shih-Chang Chen, Taichung (TW); Tsair Rong Chen, Changhua (TW)

(73) Assignee: Wetek Corporation, Hsin Chu (TW)

( * ) Notice: Subject to any disclaimer, the term of this patent is extended or adjusted under 35 U.S.C. 154(b) by 103 days.

(21) Appl. No.: 10/707,739

(22) Filed: Jan. 8, 2004

(65) Prior Publication Data

US 2005/0088100 A1    Apr. 28, 2005

(30) Foreign Application Priority Data

Mar. 13, 2003    (TW) ............................. 92105457 A

(51) Int. Cl.
*H02J 7/00*    (2006.01)
(52) U.S. Cl. ................... 320/136; 320/135; 320/134
(58) Field of Classification Search .............. None
See application file for complete search history.

(56) References Cited

U.S. PATENT DOCUMENTS

| | | | |
|---|---|---|---|
| 5,471,114 A * | 11/1995 | Edwards et al. | 315/86 |
| 6,255,744 B1 * | 7/2001 | Shih et al. | 307/66 |
| 6,441,584 B1 * | 8/2002 | Crass | 320/131 |

* cited by examiner

Primary Examiner—Tuyet Thi Vo
(74) Attorney, Agent, or Firm—Jiang Chyun IP Office

(57) ABSTRACT

An emergency lighting equipment with an automatic charge/discharge and monitoring system is provided. The emergency lighting equipment comprises an operating mode control circuit, a rectify/voltage-divide and voltage regulation circuit, a main control unit, an illuminating apparatus and a battery. A battery discharge operating is initiated when the main control unit detects the passage of a preset period without any battery discharge operation. The main control unit also terminates a battery discharging operation when the discharge operation is completed and terminates a battery charging operation after the battery has been float-charged for a preset period of time. The emergency lighting equipment may include a battery state inspection circuit for issuing a warning signal when the battery is found to be defective.

16 Claims, 3 Drawing Sheets

EMERGENCY LIGHTING EQUIPMENT WITH AUTOMATIC CHARGE/DISCHARGE AND MONITORING SYSTEM

CROSS REFERENCE TO RELATED APPLICATIONS

This application claims the priority benefit of Taiwan application serial no. 92105457, filed on Mar. 13, 2003.

BACKGROUND OF INVENTION

1. Field of Invention

The present invention relates to an emergency lighting equipment and charge/discharge method. More particularly, the present invention relates to an emergency lighting equipment with automatic charge/discharge and monitoring system.

2. Description of Related Art

Emergency lighting equipment is an electrical appliance with a long history. The equipment provides some form of illumination to prevent accidents from happening when normal power is suddenly cut. Although most emergency lighting systems currently in the market have had many improvements, some problems including effective working life, damage warning and aesthetic appeal still need to be addressed.

At present, most emergency lighting systems on sale in the market have a working life of only one to two years. Moreover, system failure is often found after an actual power outage has occurred. Because the emergency lighting system is used mainly to prevent accidents, their failure is a serious concern. The short working life of the emergency lighting system is also of great concern to the environmentalists because a substantial number of the systems must be replaced each year. The failure of most automatic lighting system lies typically in an inappropriate design of the battery charging/discharging unit. In general, once an emergency lighting system is installed, nobody would take care to inspect and maintain the system periodically. Furthermore, most manufacturers are concerned about providing additional functions to the emergency lighting system and improving its outlook such as installing fluorescent lamp instead of tungsten lamp. In other words, the battery in the lighting system is in a constant float-charging stage after installation unless there is an actual power outage. Since prolonged charging is likely to shorten the working life of a battery, the emergency lighting system has a short useful life.

Due to cost consideration, most emergency lighting systems have no low voltage inspection circuits. In other words, the internal electronic circuits are still in the discharging state long after the battery is completely discharged. When the power outage period is long, the emergency lighting system is still in the discharging state even after all energy is drained from the battery. Ultimately, the battery is permanently damaged.

In brief, conventional emergency lighting systems have the following drawbacks: 1. The battery inside an emergency lighting system is in a float-charging state so that the system can have a maximum working life of between one to two years. Furthermore, failure is only found after an actual power outage has occurred. 2. Since there is no low voltage inspection circuit inside the system, the battery may be permanently damaged by over-discharge. 3. There is little control over the discharge current in an emergency lighting system. Thus, the system will stop providing any illumination after a while if the power outage is long.

SUMMARY OF INVENTION

Accordingly, one object of the present invention is to provide an emergency lighting equipment with an automatic charge/discharge and monitoring system that discharges according to whether an alternating current voltage source is present or absent or a predefined period has passed since the last discharge operation or not. Furthermore, the emergency lighting equipment has a self-testing circuit for checking the state of its internal battery and issuing an alarm whenever the battery is found to be defective.

A second object of this invention is to provide a charge/discharge method for automatically charging or discharging the battery within an emergency lighting equipment. The automatic charge/discharge method takes care of the battery charging operation automatically in such a way that a charging operation stops after the battery is in a float-charging state for some time and a discharging operation stops after the battery is in a discharging state for some time. Therefore, the battery is prevented from having any permanent damage due to float-charging too long or over-discharging for too long.

To achieve these and other advantages and in accordance with the purpose of the invention, as embodied and broadly described herein, the invention provides an emergency lighting equipment with automatic charge/discharge system. The emergency lighting equipment provides emergency illumination when a power source stops providing an alternating current voltage to the equipment. The emergency lighting equipment with automatic charge/discharge system has an operating mode control circuit, a rectify/voltage-divide and voltage regulation circuit, a battery, a main control unit and an illuminating apparatus.

The operating mode control circuit is coupled to an alternative current voltage source. The operating mode control circuit receives an alternative current (ac) voltage from the alternating current voltage source and re-transmits the ac voltage as well as an operating mode signal. The operating mode control circuit also has a button that permits a user some control over the issuance of the operating mode signal. The rectify/voltage-divide and voltage regulation circuit is coupled to the operating mode control circuit. The rectify/voltage-divide and voltage regulation circuit converts the ac voltage from the operating mode control circuit into a direct current (dc) voltage and re-transmits the dc voltage. The battery is a storage device for electrical power.

The main control unit is coupled to the battery, the rectify/voltage-divide and voltage regulation circuit and the operating mode control circuit. The main control unit receives the operating mode signal and the dc voltage. The main control unit determines its current operating mode according to the operating mode signal and determines if the ac voltage source still provides an ac voltage according to the dc voltage. The battery is charged or discharged according to the current operating mode and the state of the ac voltage source supply. If the ac voltage source provides an ac voltage continuously for a preset period of time and yet no discharge of the battery has occurred within this period, a battery discharging operation is carried out. The list of operating modes in the emergency lighting equipment includes an automatic mode for charging/discharging the battery and terminating the illumination provided by the emergency lighting equipment automatically, a manual mode allowing a user to turn on the emergency lighting equipment manually and a shutdown mode allowing a user to turn off the emergency lighting equipment manually.

The illuminating apparatus is coupled to the main control unit and the battery. The main control unit turns on the illuminating apparatus when the battery is in a discharging state but turns off the illuminating apparatus when the battery is over-discharged.

According to one preferred embodiment of this invention, the main control unit furthermore comprises an analogue/digital circuit, a micro-controller, a charge control circuit and a discharge control circuit. The analogue/digital circuit is coupled to the battery. The analogue/digital circuit measures the amount of electrical energy stored up inside the battery and issues a measure signal. The micro-controller is coupled to the analogue/digital circuit. The micro-controller receives the measure signal and outputs a charge signal or a discharge signal according to the measure signal. The micro-controller also has a timer for counting the passage of time. When the timer in the micro-controller has detected the passage of a preset period of time within which the ac voltage source provides an ac voltage continuously without any battery discharge, a discharge signal is issued. The charge control circuit is coupled to the micro-controller and the battery. The charge control circuit receives the charge signal to initiate a battery charging operation. The discharge control circuit is coupled to the illuminating apparatus, the micro-controller and the battery. The discharge control circuit receives the discharge signal to initiate a battery discharging operation. When the battery is over-discharged, the discharge control circuit will issue a shutdown signal to turn off the illuminating apparatus. The discharge control circuit also has the capacity to control the size of current from the discharging battery so that electric power provided by the battery may last longer.

The rectify/voltage-divide and voltage regulation circuit comprises a rectify/voltage-divide circuit and a constant voltage source. The rectify/voltage-divide circuit is coupled to the operating mode control circuit and the micro-controller. The rectify/voltage-divide circuit receives the ac voltage and converts the ac voltage to a dc voltage for output. The constant voltage source is coupled to the rectify/voltage-divide circuit and the charge control circuit. The constant voltage source receives the dc voltage and outputs a constant dc voltage.

The emergency lighting equipment of this invention furthermore comprises a battery state inspection circuit and a battery state warning device. The battery state inspection circuit is coupled to the micro-controller and the battery. When the state inspection circuit discovers the battery to be defective, a warning signal is issued. The battery state warning device is coupled to the micro-controller so that the battery state warning device is triggered when the micro-controller receives the warning signal.

The emergency lighting equipment of this invention furthermore comprises a security monitor circuit. The security monitor circuit is coupled to the micro-controller and the ac voltage source for recording action before the ac power source again provides an ac voltage to the emergency lighting equipment. The security monitor circuit comprises an image capture device, a wireless local network and a wireless transceiver. The image capture device is coupled to the ac voltage source. Before the ac power source provides an ac voltage, the image capture device is activated to record and output the recorded image data. The wireless local network is coupled to the image capture device for outputting the image data from the image capture device through wireless transmission. The wireless transceiver receives the image data in the wireless transmission.

According to one preferred embodiment of this invention, the emergency lighting equipment furthermore comprises an ac power source indicator light coupled to the rectify/voltage-divide and voltage regulator circuit for showing whether the ac power source is on or off.

This invention also provides a method of discharging the battery inside an emergency lighting equipment with an automatic charge/discharge and monitoring system. A micro-controller is set up to receive a dc voltage. According to the reception of a dc voltage, the micro-controller determines if an ac power source is providing an ac voltage. The micro-controller also determines if the battery power has reached a discharge cut-off voltage according to a measure signal transmitted from an analogue/digital circuit. If the batter power exceeds the discharge cut-off voltage, a battery discharge operation is initiated. On the other hand, if the battery power is still below the discharge cut-off voltage, the illuminating device is shut down. Furthermore, the micro-controller also has a timer for counting the passage of time. When the timer in the micro-controller has detected the passage of a preset period of time within which the ac voltage source provides an ac voltage continuously without any battery discharge, a battery discharge operation is initiated after assessing the surrounding brightness level. Conversely, a timer starts a 24-hour low current discharge period for the battery.

This invention also provides an alternative method of discharging the battery inside an emergency lighting equipment with an automatic charge/discharge and monitoring system. A micro-controller is set up to determine if the current battery power has reached the charge voltage according to a measurement signal transmitted from an analogue/digital circuit. If the battery power is still below the charge voltage, a battery charging operation is carried out using a constant voltage. Thereafter, the micro-controller determines if the battery power has reached a saturated voltage. If the battery power has reached the saturate voltage, the battery charging operation is terminated. Conversely, the battery charging operation is continued.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
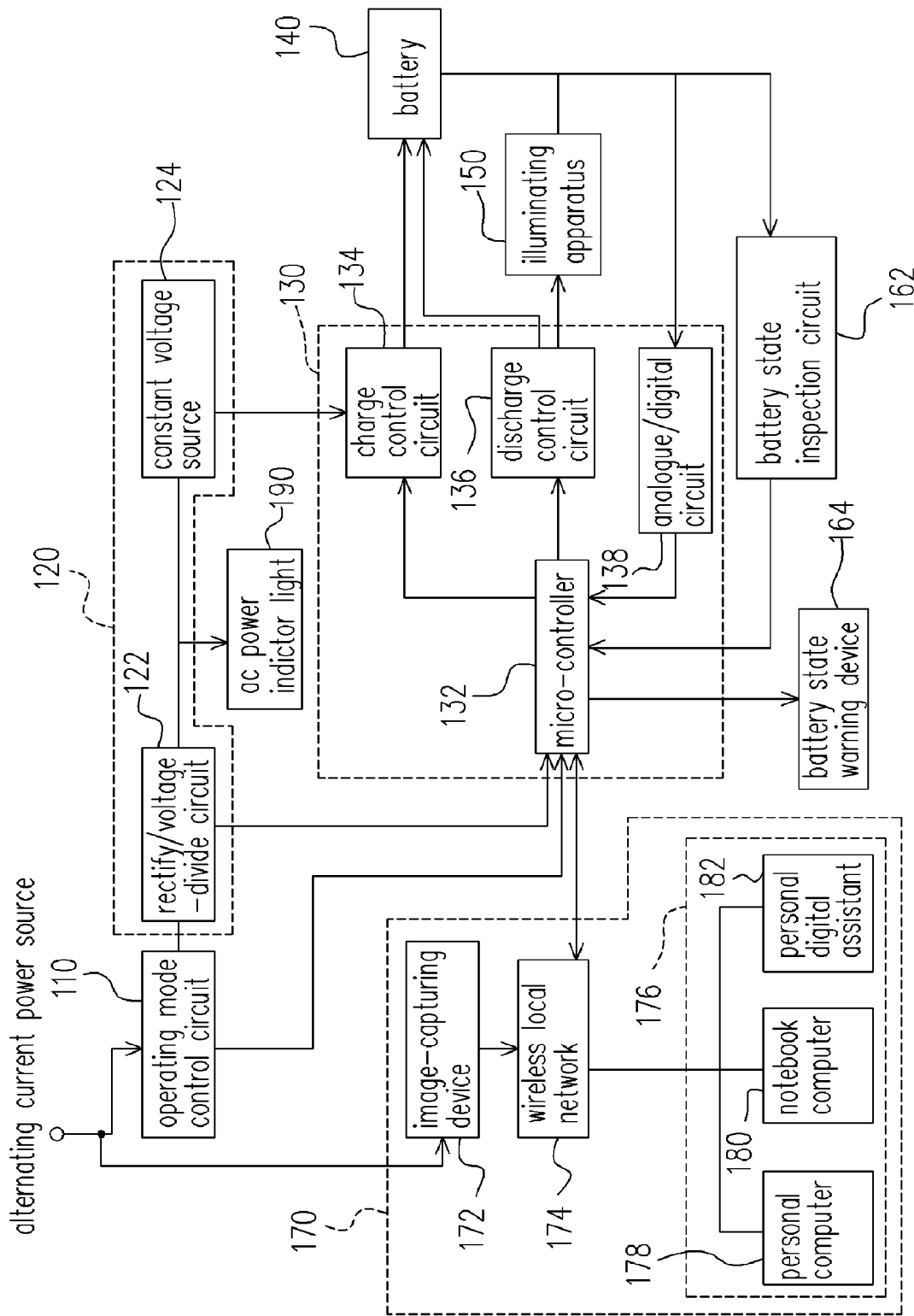
FIG. 1 is a block diagram showing the circuit layout of an emergency lighting equipment with an automatic charge/discharge and monitoring system according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram showing the circuit layout of an emergency lighting equipment with an automatic charge/discharge and monitoring system according to one preferred embodiment of this invention. The emergency light equipment has an automatic charge/discharge circuit for maintaining a long battery life and another circuit for controlling the size of discharging current from the batter so that the battery can provide power to the lighting equipment longer. In addition, a self-diagnostic circuit is installed to detect any faulty condition in the battery and issue a warning signal when the battery is found to be defective.

As shown in FIG. 1, the emergency lighting equipment 100 comprises an operating mode control circuit 110, a rectify/voltage-divide and voltage regulation circuit 120, a battery 140, a main control unit 130 and an illumination apparatus 150.

The operating mode control circuit 110 is coupled to an alternating current (ac) voltage source for receiving and re-transmitting the ac voltage and issuing an operating mode signal. The operating mode control circuit also has one or a multiple of buttons for user to select the type of operating signal output from the operating mode control circuit 110.

The rectify/voltage-divide and voltage regulation circuit 120 is coupled to the operating mode control circuit 110 for converting the ac voltage from the operating mode control circuit 110 into direct current (dc) voltage. The battery 140 is a power storage device. The main control unit 130 is coupled to the battery 140, the rectify/voltage-divide and voltage regulation circuit 120 and the operating mode control circuit 110. The main control unit 130 receives the operating mode signal from the operating mode control circuit 110 and the dc voltage from the rectify/voltage-divide and voltage regulation circuit 120. The operating mode signal determines the current operating mode and the dc voltage determines if the ac voltage source is providing an ac voltage. According to the operating mode and state of connection of the ac voltage source, the main control unit 130 initiates a battery charging or discharging operation. The main control unit 130 also carries out a battery discharging operation when the timer in the micro-controller has detected the passage of a preset period of time within which the ac voltage source provides an ac voltage continuously without any battery discharge. The preset period can be set to whatever length but a 90-day period is normal.

Figure 2:
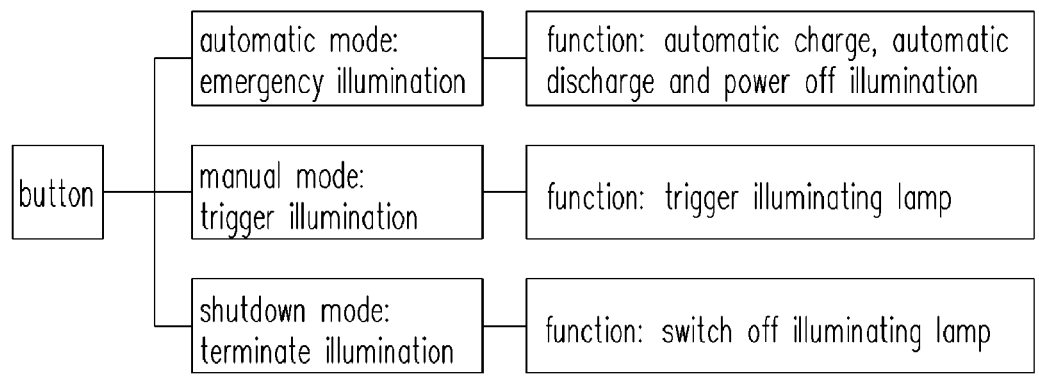
FIG. 2 is a block diagram showing various operating modules of an emergency lighting equipment according to one preferred embodiment of this invention.

FIG. 2 is a block diagram showing various operating modules of an emergency lighting equipment according to one preferred embodiment of this invention. As shown in FIG. 2, the operating mode includes an automatic mode, a manual mode and a shutdown mode. In the automatic mode, the battery inside the emergency lighting equipment is charged/discharged and the battery power to the illuminating apparatus is turned on/off automatically. In the manual mode, the power to the illuminating apparatus is switched on manually. In the shutdown mode, power to the emergency lighting equipment is switched off manually.

As shown in FIG. 1, the illuminating apparatus 150 is coupled to the main control unit 130 and the battery 140. When the battery 140 discharges, the illuminating apparatus 150 is activated. On the other hand, when the battery 140 is over-discharged, the main control unit 130 shuts down the illuminating apparatus 150. The illuminating apparatus 150 often uses a light-emitting diode for illumination because a light-emitting diode consumes very little power and produces minimal radiation and eye irritation. Since no transformer is required to boot up the light-emitting diode, power efficiency is also improved.

The main control unit 130 furthermore comprises an analogue/digital circuit 138, a micro-controller 132, a charge control circuit 134 and a discharge control circuit 136. The analogue/digital circuit 138 is coupled to the battery 140 for measuring battery power and outputting a measurement signal thereafter. The micro-controller 132 is coupled to the analogue/digital circuit 138 for receiving the measurement signal from the analogue/digital circuit 138 and outputting a charge signal or a discharge signal according to the measurement signal. The micro-controller also has a timer. When the timer in the micro-controller 132 has detected the passage of a preset period of time within which the ac voltage source provides an ac voltage continuously without any battery discharge, the micro-controller 132 outputs a discharge signal to discharge the battery 140. The charge control circuit 134 is coupled to the micro-controller 132 and the battery 140 for receiving the charge signal from the micro-controller 132 and charging the battery 140 thereafter. The discharge control circuit 136 is coupled to the illuminating apparatus 150, the micro-controller 132 and the battery 140 for receiving the discharge signal from the micro-controller 132 and discharging the battery 140 thereafter. Furthermore, when the battery 140 is over-discharged, the discharge control circuit 136 outputs a shutdown signal to the illuminating apparatus 150 to switch off the illuminating apparatus 150.

When the iris of human eyes adapted to intense light encounters darkness suddenly, sight is lost momentarily. This may cause some people to panic. The emergency lighting equipment of this invention is triggered to produce light gradually after transient power outage so that the lamp is prevented from burning due to too much current and the human eyes can adapt to the sudden change in brightness level. Once the iris is adjusted to the dimmer emergency illumination and the human is psychologically prepared, the brightness level of the lamp can be downward adjusted again. To implement the aforementioned illumination adjustments, the discharge control circuit 136 operates as a pulse width modulator. The discharge control circuit 136 controls the size of the battery discharge current such that the lamp is fed with an increasing current at the beginning of power outage and then gradually lowering the battery discharge current once the human eyes have adapted to a dark environment. With this arrangement, the battery 140 can power the emergency lighting equipment a little longer.

In the embodiment of this invention, the rectify/voltage-divide and voltage regulation circuit 120 furthermore comprises a rectify/voltage-divide circuit 122 and a constant voltage source 124. The rectify/voltage-divide circuit 122 is coupled to the operating mode control circuit 110 and the micro-controller 132 for converting ac voltage to a dc voltage. The constant voltage source 124 is coupled to the rectify/voltage-divide circuit 122 and the charge control circuit 134 for receiving the dc voltage and outputting the dc voltage as a constant voltage.

The emergency lighting equipment of this invention also has a battery state inspection circuit 162 and a battery state warning device 164. The battery state inspection circuit 162 is coupled to the micro-controller 132 and the battery 140 for issuing a warning signal when the battery 140 is found to be defective. The battery state warning device 164 is coupled to the micro-controller 132. On receiving the warning signal, the micro-controller 132 activates the battery state warning device 164 to sound a warning.

In the embodiment of this invention, the emergency lighting equipment 100 furthermore comprises a security monitor circuit 170 coupled to the micro-controller 132 and the ac power source. Before the ac power source provides an ac voltage to the emergency lighting equipment 200, the security monitor circuit 170 is triggered to record any action in surrounding premises. The security monitor circuit 170 comprises an image-capturing device 172, a wireless local network 174 and a wireless transceiver 176.

The image-capturing device 172 is coupled to the ac voltage source. When the ac power source stops providing an ac voltage to the emergency lighting equipment 200, the image-capturing device 172 is activated to record images and output the image data. The wireless local network 174 is coupled to the image-capturing device 172. On receiving the image data, the wireless local network 174 transmits the data in a wireless transmission. The wireless transceiver 176 receives the image data transmitted from the wireless local network 174. The wireless transceiver 176 can be a personal computer, a notebook computer 180 or a personal digital assistant (PDA) 182, for example, but is not limited as such.

In the embodiment of this invention, the wireless transmission method can be any one of the standard network architectures recommended by IEEE including, for example, the 802.11b, 802.11g and 802.11a, but is not limited as such.

The emergency lighting equipment 100 of this invention may further comprise an ac power indictor light 190 coupled to the rectify/voltage-divide and voltage regulation circuit 120 to show the presence or absence of ac power.

In the following, the steps for operating the emergency lighting equipment 100 are described. First, the operating mode control circuit 110 receives the ac voltage provided by an ac power source and transmits the ac voltage as well as the operating mode signal. The rectify/voltage divide and voltage regulation circuit 120 receives the ac voltage and converts the ac voltage into a dc voltage. The main control unit 130 receives the operating mode signal and the dc voltage. The current operating mode is determined according to the operating mode signal and whether the ac power source provides an ac voltage is determined according to the dc voltage. When the power ac source stops providing any ac voltage, the battery 140 is discharged. On the other hand, if the battery 140 has not yet reached the charge-up voltage, the battery 140 is charged. When the main control unit 130 has detected the passage of a preset period of time within which the ac voltage source provides an ac voltage continuously without any battery discharge, the battery 140 is discharged. If the battery 140 is over-discharged, the main control unit 130 will issue a shutdown signal to switch off the illuminating apparatus 150. Furthermore, the main control unit 130 also triggers the battery state warning device 164 on receiving the warning signal from the battery state inspection circuit 162 so that the user is forewarned that the battery 140 is defective.

Figure 3:
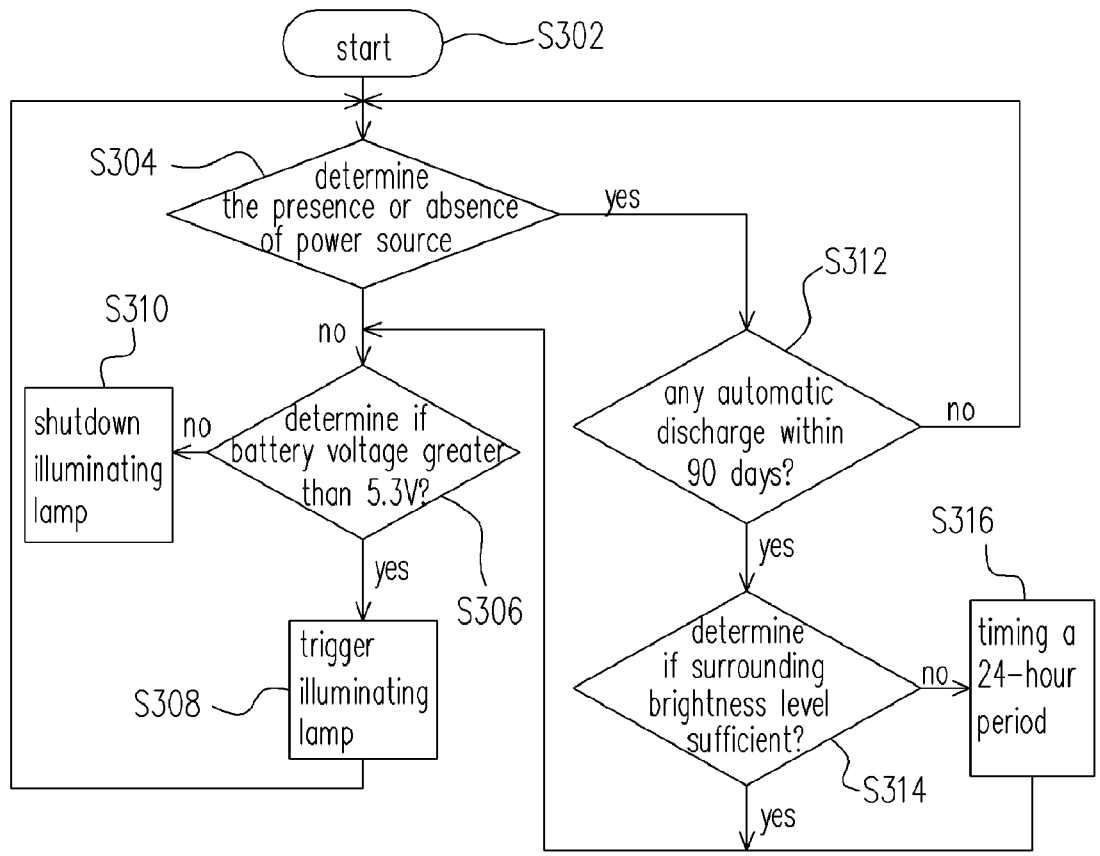
FIG. 3 is a flow chart showing a method of discharging the battery inside an emergency lighting equipment according to one preferred embodiment of this invention.

FIG. 3 is a flow chart showing a method of discharging the battery inside an emergency lighting equipment according to one preferred embodiment of this invention. As shown in FIG. 3, the micro-controller receives a dc voltage (s302). According to the dc voltage, the micro-controller determines if the ac power source continues to provide an ac voltage (s304). The micro-controller also determines if the battery power has reached the discharge cut-off voltage according to the measurement signal from the analogue/digital circuit (s306). The discharge cut-off voltage is set at 5.3V. If the battery power exceeds the cut-off voltage, the battery discharges (s308). If the battery power is below the cut-off voltage, the battery discharge is stopped and the illuminating apparatus is switched off (s310). In addition, when the timer inside the micro-controller has detected the passage of a preset period of time within which the ac voltage source provides an ac voltage continuously without any battery discharge (s312), the battery discharges after assessing the brightness level of the environment. Conversely, the timer counts a 24-hour period and initiates a low current discharge. The preset period is set to 90 days, for example.

In the embodiment of this invention, a circuit incorporating some cadmium sulfide (CdS) is used to assess the brightness level around the emergency lighting equipment.

Figure 4:
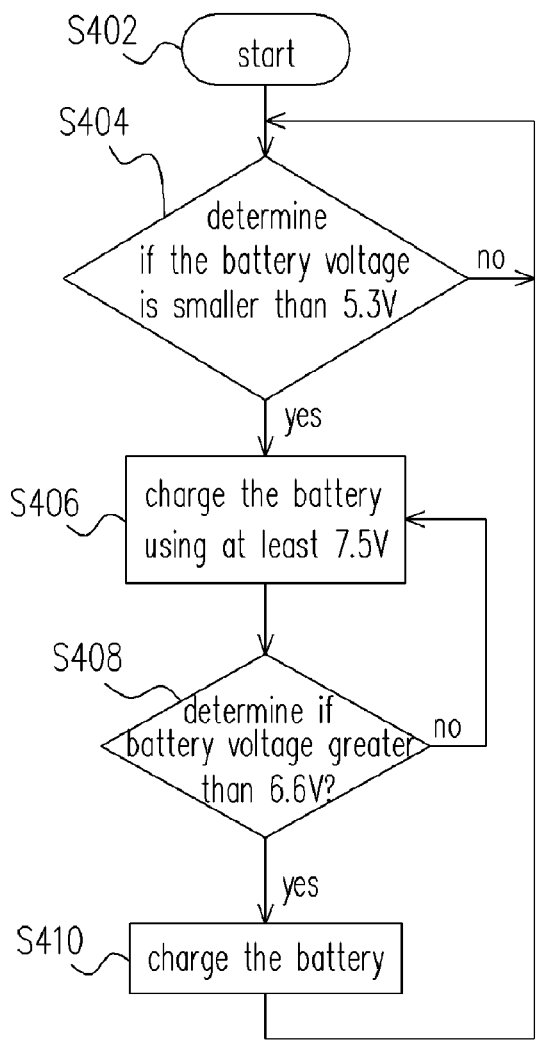
FIG. 4 is a flow chart showing a method of charging the battery inside an emergency lighting equipment according to one preferred embodiment of this invention.

FIG. 4 is a flow chart showing a method of charging the battery inside an emergency lighting equipment according to one preferred embodiment of this invention. As shown in FIG. 4, the micro-controller receives the measurement signal from the analogue/digital circuit (s402). The micro-controller determines if the current power has not yet reached charge-up voltage (s404). The charge-up voltage is set to 5.3V, for example. If the battery power has still not reached the charge-up voltage, the battery is charged through the constant voltage (s406). The constant voltage is normally set to at least 7.5V, for example. Next, the battery power is checked to determine if it has reached the saturated voltage (s408). The saturated voltage is set to between 6.6V to 7.3V. If the battery power has already been saturated, the battery charging operation is terminated (s410). Conversely, the battery charging operation is continued.

Figure 5:
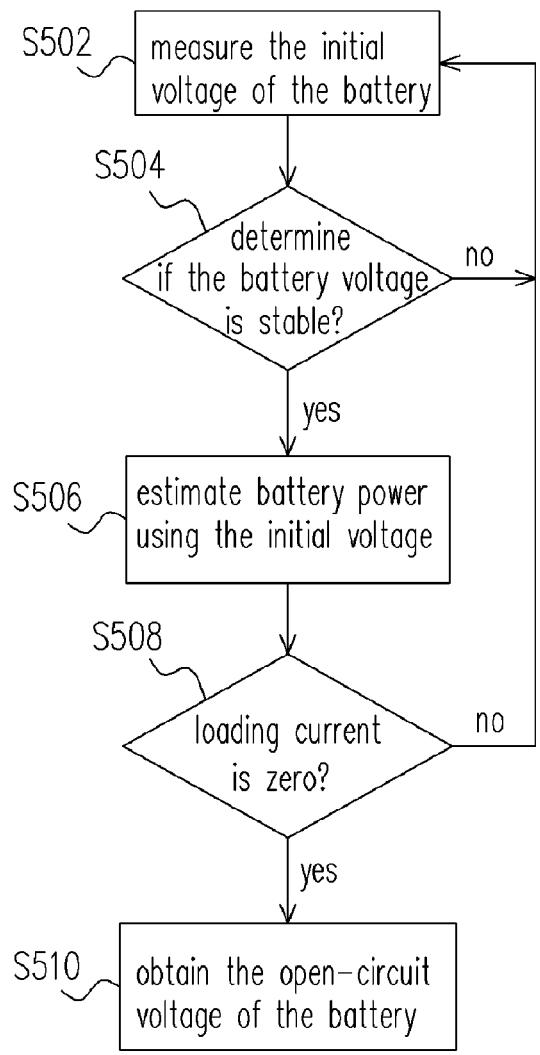
FIG. 5 is a flow chart showing a method of inspecting the battery state of a battery inside an emergency lighting equipment according to one preferred embodiment of this invention.

FIG. 5 is a flow chart showing a method of inspecting the battery state of a battery inside an emergency lighting equipment according to one preferred embodiment of this invention. As shown in FIG. 5, the battery state inspection circuit finds an initial battery voltage after the battery charging operation (s502). Next, stability of the battery discharge voltage during a battery discharge operation is assessed (s504). If the battery voltage is stable, the initial battery voltage is used to predict the power the battery contains (s506), otherwise, return to step s502. Thereafter, the loading current is checked to determine if it is zero or not (s508). If the loading current is zero, the open-circuit voltage of the battery is measured to determine if the battery is defective (s510). If the loading current is non-zero, return to step s502.

The state of the battery can be inspected using an open-circuit voltage method or a Fourier method, for example, but is not limited as such.

In summary, the emergency lighting equipment and battery charging method has the following advantages: 1. The battery will automatically discharge after a set period of time without any discharge so that the battery life is increased considerably. 2. After the battery has float-charged for a period of time, the battery charging operation stops automatically so that any damage to the battery due to overcharging is prevented. 3. When the battery is over-discharged, discharge from the battery is terminated automatically to prevent any damage to the battery. 4. The battery state inspection circuit and the battery state warning device together detects any defects in the battery and issues a warning signal to inform the user for a battery replacement. 5. A security monitor circuit is incorporated into the emergency lighting equipment so that the equipment can serve as a monitor, image recorder or a security informer. 6. The emergency lighting equipment uses a pulse width modulation device to provide a gradually increasing current from the battery at the first moment of transient power outage to prevent the lamp from having an overloading current as well as compensating for transient visual brightness level difference. The current is gradually reduced to dim the lamp after the human eyes have adapted to a darker environment so that the battery power can last longer. 7. The illuminating apparatus uses a light-emitting diode as the source of illumination so that very little energy is consumed and very low radiation is emitted from the light source to cause any eye irritation. Furthermore, since no transformer is needed to trigger the light-emitting diode, efficiency of the illuminating apparatus is improved.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

The invention claimed is:

1. An emergency lighting equipment with an automatic battery charge/discharge and monitoring system for providing emergency illumination when an alternating current (ac) power source stops providing an ac voltage, the emergency lighting equipment comprising:
   an operating module control circuit coupled to the ac power source for receiving and re-transmitting the ac voltage and outputting an operating mode signal;
   a rectify/voltage-divide and voltage regulation circuit coupled to the operating mode control circuit for converting the ac voltage from the operating mode control circuit to a direct current (dc) voltage;
   a battery for holding electric energy;
   a main control unit coupled to the battery, the rectify/voltage-divide and voltage regulation circuit and the operating mode control circuit for receiving the operating mode signal from the operating mode control circuit and the dc voltage from the rectify/voltage-divide and voltage regulation circuit, determining the current operating mode according to the operating mode signal, determining if the ac power source still provides an ac voltage according to the dc voltage and charging or discharging the battery accordingly, and furthermore, discharging the battery if the ac power source has provided an ac voltage continuously for a preset period of time during which there is no battery discharge; and
   an illuminating apparatus coupled to the main control unit and the battery, wherein the illuminating apparatus is triggered when the battery discharges and the illuminating apparatus is shutdown by the main control unit when the battery is over-discharged.

2. The emergency lighting equipment of claim 1, wherein the rectify/voltage-divide and voltage regulation circuit furthermore comprises:
   a rectify/voltage-divide circuit coupled to the operating mode control circuit and the micro-controller for converting the an voltage into a dc voltage; and
   a constant voltage source coupled to the rectify/voltage-divide circuit and the charge control circuit for receiving the dc voltage and outputting the dc voltage as the constant voltage.

3. The emergency lighting equipment of claim 1, wherein the preset period is set to 90 days.

4. The emergency lighting equipment of claim 1, wherein the equipment additionally comprises an ac power source indicator light coupled to the rectify/voltage-divide and voltage regulation circuit for indicating the presence of absence of an ac voltage supply.

5. The emergency lighting equipment of claim 1, wherein the illuminating apparatus uses a light-emitting diode as a source of illumination.

6. The emergency lighting equipment of claim 1, wherein the operating mode control circuit furthermore comprises a button for setting the operating mode into an automatic mode, a manual mode or a shutdown mode.

7. The emergency lighting equipment of claim 1, wherein the main control unit furthermore comprises:
   an analogue/digital circuit coupled to the battery for measuring the battery power and outputting a measurement signal;
   a micro-controller coupled to the analogue/digital circuit for receiving the measurement signal and outputting a charge signal or a discharge signal accordingly, wherein the micro-controller also has a tinier for timing the passage of the preset period with ac voltage but without any battery discharge and outputting a discharge signal at the end of the preset period;
   a charge control circuit coupled to the micro-controller and the battery for receiving the charge signal to initiate a battery charging operation; and
   a discharge control circuit coupled to the illuminating apparatus, the micro-controller and the battery for receiving the discharge signal and initiating a battery discharge operation, and furthermore, outputting a shutdown signal to the illuminating apparatus to switch off the illuminating apparatus when the battery is over-discharged.

8. The emergency lighting equipment of claim 7, wherein the discharge control circuit comprises a pulse width modulation device for controlling the size of current when the battery discharges and the duration of the batter discharge.

9. The emergency lighting equipment of claim 1, wherein the equipment additionally comprises a battery state inspection circuit coupled to the micro-controller and the battery for issuing a warning signal when the battery is found to be defective.

10. The emergency lighting equipment of claim 9, wherein the equipment additionally comprises a battery state warning device coupled to the micro-controller for issuing a warning and triggered by the micro-controller when the micro-controller receives the warning signal.

11. The emergency lighting equipment of claim 9, wherein the battery state inspection circuit uses an open-circuit method or a Fourier method of operation.

12. The emergency lighting equipment of claim 1, wherein the equipment additionally comprises a security monitor circuit coupled to the micro-controller and the ac voltage far monitoring and recording images when the ac power source stops providing an ac voltage.

13. The emergency lighting equipment of claim 12, wherein the security monitor circuit furthermore comprises:
   an image-capturing device coupled to the ac voltage for initiating image recording and outputting the image data after the ac power source has stopped providing an ac voltage;

a wireless local network coupled to the micro-controller and the image-capturing device such that the micro-controller controls the wireless transmission of data captured by the image-capturing device; and a wireless transceiver for receiving the image data transmitted through wireless transmission.

14. The emergency lighting equipment of claim 13, wherein the wireless transceiver comprises a personal computer.

15. The emergency lighting equipment of claim 13, wherein the wireless transceiver comprises a notebook computer.

16. The emergency lighting equipment of claim 13, wherein the wireless transceiver comprises a personal digital assistant.

* * * * *